United States Patent
Ye et al.

(10) Patent No.: US 11,065,680 B2
(45) Date of Patent: Jul. 20, 2021

(54) MESH FOR WEAR RESISTANCE IN COMPONENTS AND COMPONENTS INCLUDING THE WEAR RESISTANT MESH

(71) Applicants: Zheng Ye, Claremore, OK (US); Ignacio Martinez, Tulsa, OK (US)

(72) Inventors: Zheng Ye, Claremore, OK (US); Ignacio Martinez, Tulsa, OK (US)

(73) Assignee: BAKER HUGHES, A GE COMPANY, LLC, Houston, TX (US)

(*) Notice: Subject to any disclaimer, the term of this patent is extended or adjusted under 35 U.S.C. 154(b) by 757 days.

(21) Appl. No.: 15/616,387

(22) Filed: Jun. 7, 2017

(65) Prior Publication Data
US 2018/0354027 A1    Dec. 13, 2018

(51) Int. Cl.
*B22D 19/02* (2006.01)
*B33Y 10/00* (2015.01)
*B33Y 80/00* (2015.01)

(52) U.S. Cl.
CPC .............. *B22D 19/02* (2013.01); *B33Y 10/00* (2014.12); *B33Y 80/00* (2014.12)

(58) Field of Classification Search
CPC ..................................................... B23K 26/00
USPC ........................................ 219/121.6–121.86
See application file for complete search history.

(56) References Cited

U.S. PATENT DOCUMENTS

| | | | | |
|---|---|---|---|---|
| 2,550,918 | A * | 5/1951 | Otto | E04F 11/1836 198/338 |
| 8,333,922 | B2 | 12/2012 | Skoglund et al. | |
| 9,644,489 | B1 * | 5/2017 | Tham | B33Y 10/00 |
| 2015/0113881 | A1 * | 4/2015 | De Reynal | B24D 18/0009 51/297 |
| 2016/0185009 | A1 * | 6/2016 | Keshavan | B28B 1/001 249/134 |
| 2016/0232262 | A1 * | 8/2016 | Shayani | G06T 17/10 |

OTHER PUBLICATIONS

"Additive Manufacturing: Technology Metals and Manufacturing Processes"; H.C. Starck GmbH; 2017; Internet; URL: https://www.hcstarck.com/additive_manufacturing_w_mo_ta_nb_re; 3 pages.
"Breakthrough Achieved in Ceramics 3D Printing Technology"; HRI Laboratories, LLC; Jan. 1, 2016; 3 pages; http://www.hrl.com/news/2016/0101/.
"Towards Additive Manufacturing of Tungsten Carbide Using Renewable Resources"; ECS 229th Meeting; May 29-Jun. 2, 2016; Hilton San Diego Bayfront & San Diego Center; Internet; URL: https://ecs.confex.com/ecs/229/webprogram/Paper 66973.html; 8pages.
(Continued)

*Primary Examiner* — Thien S Tran
(74) *Attorney, Agent, or Firm* — Cantor Colburn LLP

(57) ABSTRACT

A wear resistant mesh for construction of a component includes a plurality of inserts, a web connecting the inserts to one another and maintaining geometry and spacing of the inserts. A component including a mesh including a plurality of inserts and a web connecting the inserts to one another and maintaining geometry and spacing of the inserts, a matrix material disposed about the mesh, the material exposing selected wear surfaces of the mesh. A method for making a mesh to dispose in a component for wear resistance and a method for producing a component having wear resistance and ductility.

15 Claims, 4 Drawing Sheets

(56) References Cited

OTHER PUBLICATIONS

Gruenwald, Scott J., "Heraeus Group and Exment have developed a 3D printing process that uses amorphous metals", Jun. 16, 2016; https://3dprint.com/138610/3d-printing-amorphous-metals/3 pages.
Uhlmann, et al., "Investigation on Additive Manufacturing of Tungsten Carbide-Cobalt by Selective Laser Melting"; 15th Machining Innovations Conference for Aerospace Industry; 2015; 8 pages.

* cited by examiner

MESH FOR WEAR RESISTANCE IN COMPONENTS AND COMPONENTS INCLUDING THE WEAR RESISTANT MESH

BACKGROUND

Components of machines often are subject to wear at least on portions of the surface area thereof. This includes bearings, bushings, shafts, drill bits fracing equipment, valves, pumps, etc. Wear dictates the service life of such components and hence it has always been a goal of machine builders to reduce the impact of wear. Often grease and other lubricants are the go to for wear reduction or control. And while these work well, the components still wear faster than users would like. Another approach is to hardcoat a component with abrasive resistant material such as Tungsten Carbide (WC), Silicon Carbide (SiC), Nickel Boride (NiB), Zirconia, etc. at least on the wear surfaces. And while this approach can be effective, it is costly and the materials brittle and hence is not always a viable solution.

In view of the foregoing, the art would be receptive to alternative solutions to wear issues for components.

SUMMARY

A wear resistant mesh for construction of a component includes a plurality of inserts, a web connecting the inserts to one another and maintaining geometry and spacing of the inserts.

A component including a mesh including a plurality of inserts and a web connecting the inserts to one another and maintaining geometry and spacing of the inserts, a matrix material disposed about the mesh, the material exposing selected wear surfaces of the mesh.

A method for making a mesh to dispose in a component for wear resistance including growing a plurality of inserts and a web connecting the inserts to one another and maintaining geometry and spacing of the inserts.

A method for producing a component having wear resistance and ductility including growing a mesh including a plurality of inserts and a web connecting the inserts to one another and maintaining geometry and spacing of the inserts, and disposing a matrix material about the mesh such that surfaces destined for wear have exposed wear surfaces of the mesh.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
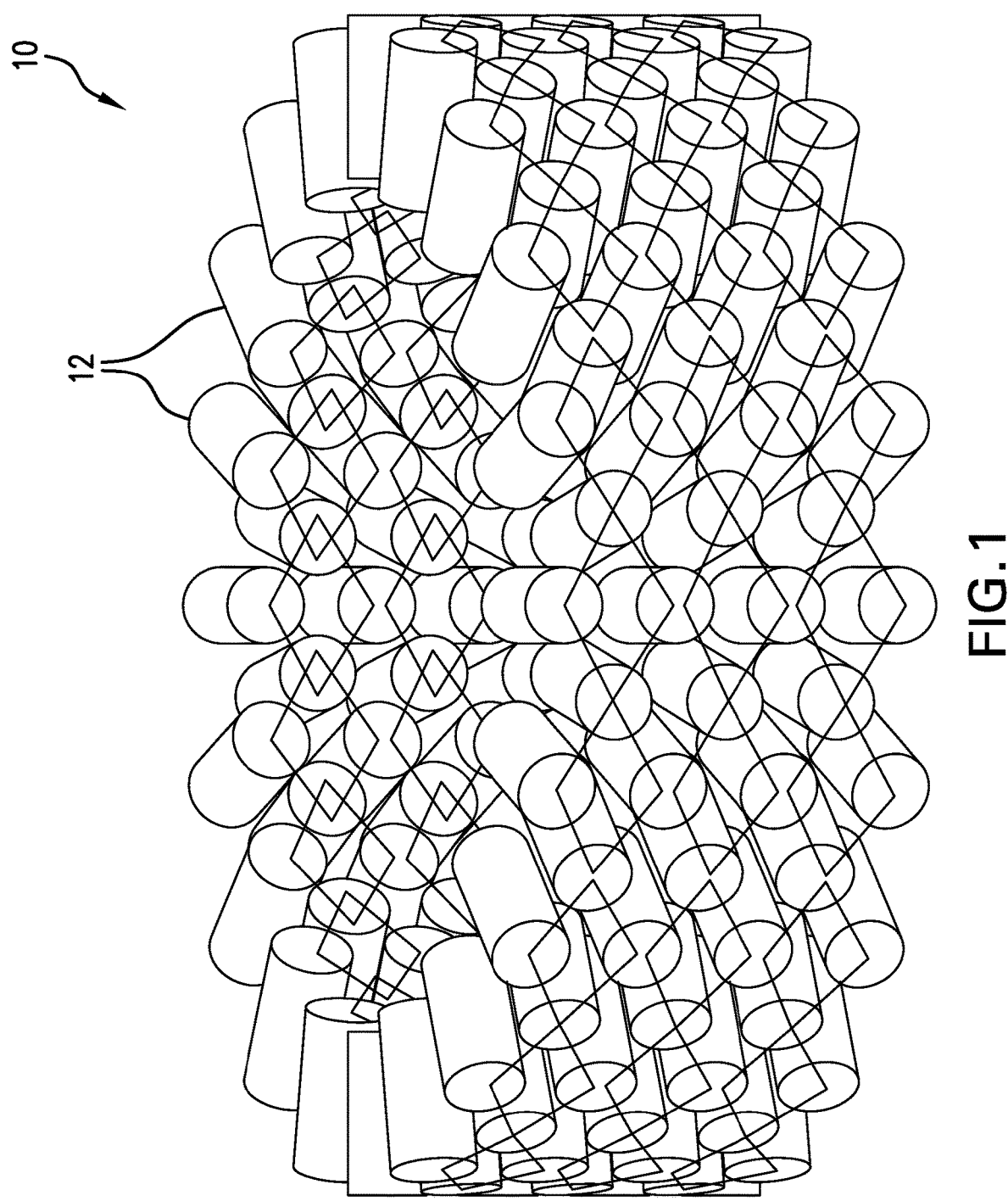
FIG. 1 is a perspective view of a mesh as disclosed herein.

Referring to FIG. 1, a mesh 10 having a number of hard inserts 12 arranged in a pattern that will cause wear surfaces 14 of the hard inserts 12 to align with a surface of a component that is ultimately created including the mesh 10. Maintaining the hard inserts 12 in a preselected position are a plurality of webs 16 that join the inserts 12 together in the preselected position. The mesh 10 is created using various additive manufacturing methods including direct metal laser melting (DMLM), Direct Metal Laser Sintering (DMLS), or electron beam melting, for example. In one iteration a green mesh 10 may be grown for later sintering. In another iteration, the mesh 10 may be grown as a fully hardened part. In another iteration jet binding using a Tungsten powder and a binder to grow the mesh which thereafter is infiltrated with a cobalt or nickel material followed by a sintering process or the jet binding process may be employed with tungsten and cobalt or nickel powders together to avoid the infiltration step during sintering. In another iteration, stereolithography (SLA) uses a photocurable resin filled with a high loading of ceramic powder to grow the green mesh 10 by laser. Other ceramic materials that may be employed include Tungsten Carbide (WC), Silicon Carbide (SiC), Nickel Boride (NiB), Zirconia and combinations including at least one of the foregoing. It is also noted that the webs 16 may be of a different material than the inserts 12 through additive manufature to provide for some degree of flexibility which may for example aid in handlability. The noted processes are known to those of skill in the art and commercially available from vendors.

These processes make possible the concept disclosed herein of creating a significantly better wear resistant components by configuring the mesh 10 to be overmolded or cast into the component that is to be the final product. It should be understood that the positioning of the inserts 12 and the webs 16 are specific to each type of component that is to be manufactured so that the surfaces 14 (for example . . . other surfaces of the inserts might be the ones that are intended to be exposed in the final component in different iterations) will be exposed at the wear surfaces of the component part that is to be manufactured. Since the surfaces 14 are all prepositioned with the webs 16, they will have whatever pattern the designer sought for the best wear resistance in the component to be manufactured while allowing the rest of the component to benefit from added ductility of a material that is not so hard as the inserts. The meshes 10 are easy to handle and place in a mold for casting or molding the final component and they do not allow the inserts 12 and surfaces 14 to migrate from their desired positions during the casting or molding process of the component.

Still referring to FIG. 1, the illustration is but one configuration of the mesh 10 that may be created. The mesh 10 is configurable to ensure that a hard insert surface is positioned where it is needed in a final component. Note too that while surfaces 14 are the contact surfaces for the embodiment of FIG. 1, there is no restriction on what part of the insert 12 will provide the surface 14 nor even on the actual geometric shape of the inset 12. Rather, the only driving factor is where a hard surface is needed and how it might be best to get it positioned as such. Due to additive manufacture, highly complex shapes are no impediment to the concept set forth herein.

Figure 2:
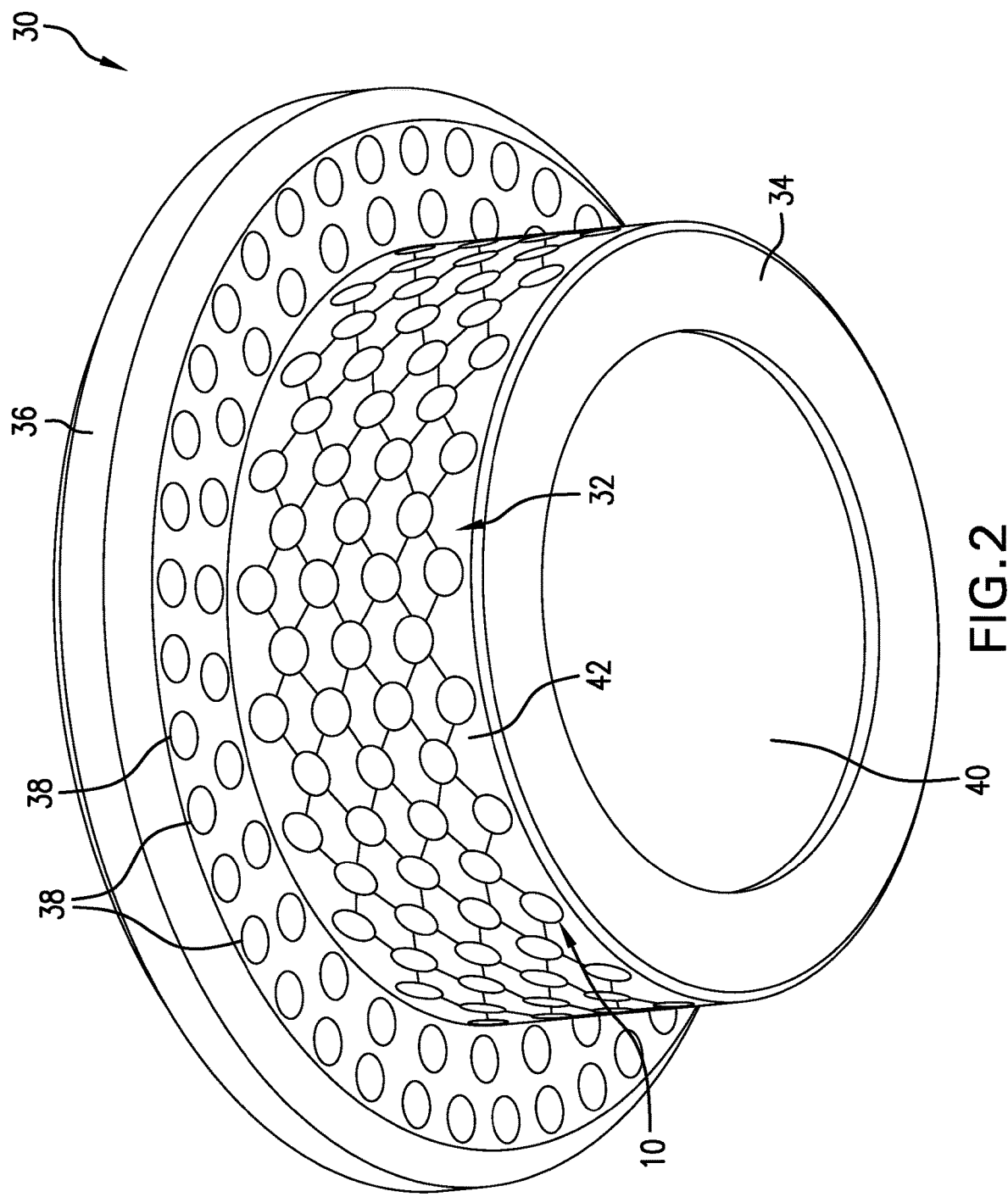
FIG. 2 is a perspective view of a component cast about the mesh of FIG. 1.

FIGS. 1 and 2 together give additional understanding of the disclosure hereof. Viewing FIG. 2, it will be appreciated that mesh 10 is in a final position within a component 30. The surfaces 14 are visible at a wear surface 32 of the component 30. It is also the case in the particular embodiment that the webs 16 are visible in the component 30 but they may or may not be depending upon how the webs are located in the mesh 10 to reliably support the inserts 12.

The component 30 includes both a collar 34 and a flange 36. In the illustrated version of mesh 10 from FIG. 1, it is only the collar portion 34 of component 30 that will have inserts from mesh 10 positioned therein but it is to be understood that the mesh 10 could also include the additional inserts 38 as a part of the mesh 10. Alternatively, the inserts 38 may be in another mesh structure or could be individually placed at the expense or expediency of manufacture. While in FIG. 2, there are no surfaces 14 illustrated on the inside surface 40 of the component 30, they certainly could be and would be if indeed the surface 40 was, in the particular embodiment, a wear surface.

To produce the final component the mesh 10 is placed within a mold and then a matrix material 42 is disposed about the mesh such that the surfaces 14 are exposed in the final component. The matrix material in embodiments may be cast over or overmolded, for example, about the mesh 10. In each case, the matrix material is selected for properties needed in the final component 30. Ductility and corrosion resistance are important properties of many that may be sought in various embodiments. Matrix materials include metals, plastics, ceramics, etc. such as Ni-resist-cast iron, duplex stainless steel, cobalt-chromuim alloys, and Austenitic Nickel Chromium alloys.

Figure 3:
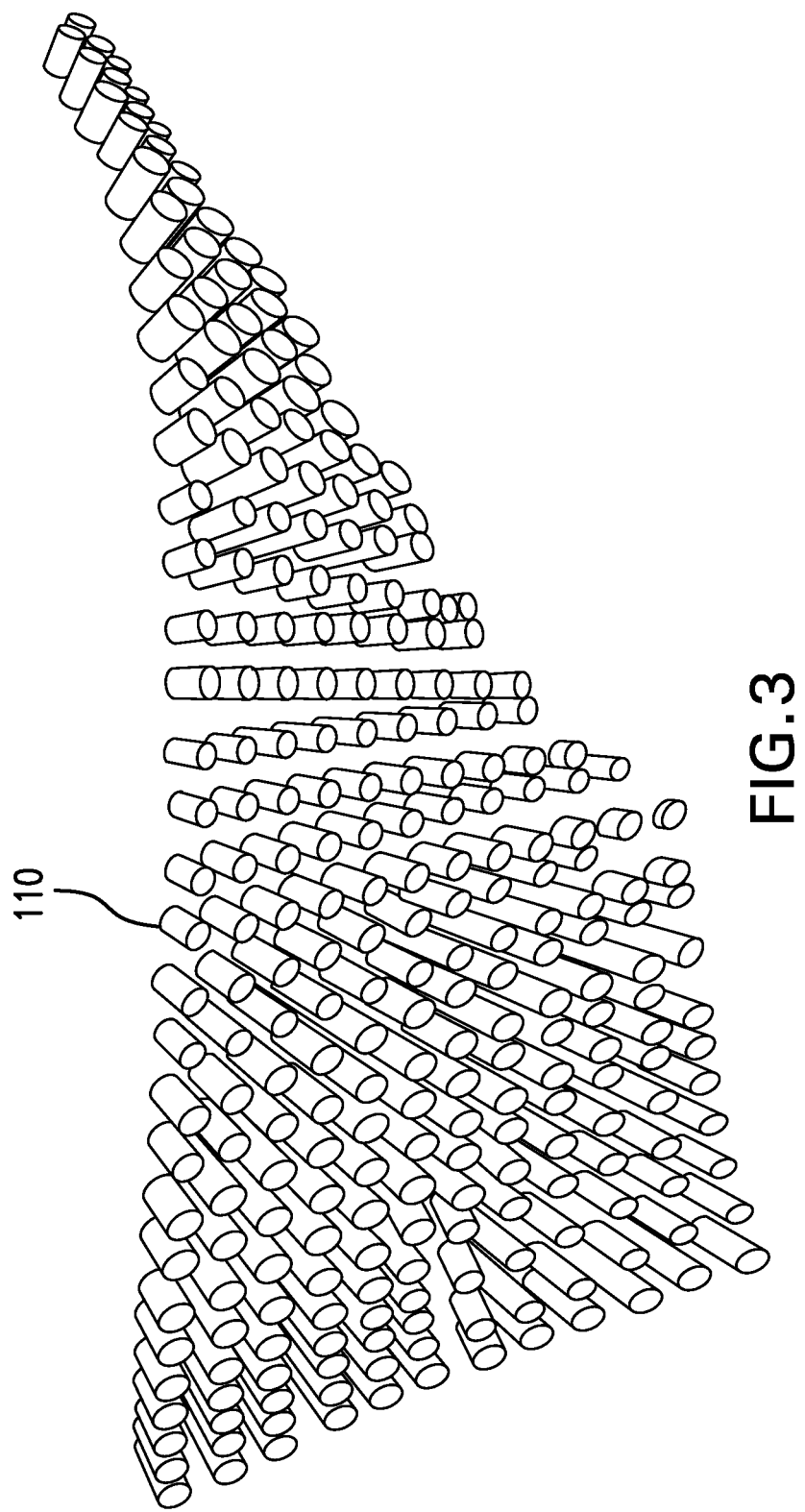
FIG. 3 is an alternative mesh as disclosed herein.
Figure 4:
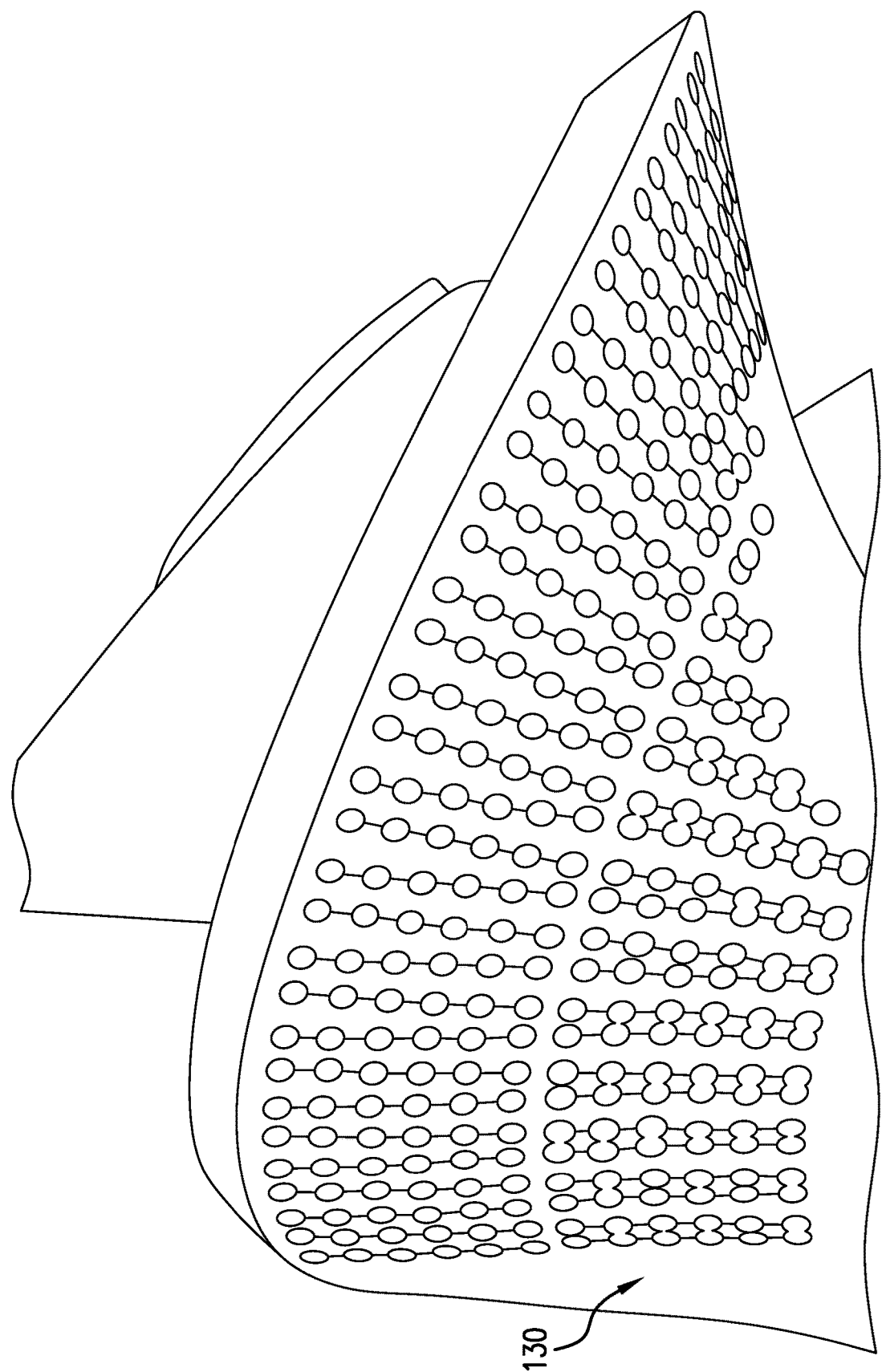
FIG. 4 is an alternative component as disclosed herein.

Referring to FIGS. 3 and 4, another embodiment is illustrated to convey the breadth of possible shapes of the mesh encompassed by the disclosure hereof. Mesh 110 is configured with the same geometry as an ESP (electric submersible pump) gas separator auger and then cast with the selected material to form component 130 as shown in FIG. 4.

Set forth below are some embodiments of the foregoing disclosure:

Embodiment 1: A wear resistant mesh for construction of a component includes a plurality of inserts, a web connecting the inserts to one another and maintaining geometry and spacing of the inserts.

Embodiment 2: The mesh as in any prior embodiment wherein the plurality of inserts include a wear surface positioned by the web to be located at a wear surface of a component of which the mesh will form a part.

Embodiment 3: The mesh as in any prior embodiment wherein the mesh has a geometry that is complementary to a component of which the mesh will form a part.

Embodiment 4: The mesh as in any prior embodiment wherein the inserts comprise Tungsten Carbide (WC), Silicon Carbide (SiC), Nickel Boride (NiB), Zirconia and combinations including at least one of the foregoing.

Embodiment 5: A component including a mesh including a plurality of inserts and a web connecting the inserts to one another and maintaining geometry and spacing of the inserts, a matrix material disposed about the mesh, the material exposing selected wear surfaces of the mesh.

Embodiment 6: The component as in any prior embodiment wherein the inserts comprise Tungsten Carbide (WC), Silicon Carbide (SiC), Nickel Boride (NiB), Zirconia and combinations including at least one of the foregoing.

Embodiment 7: The component as in any prior embodiment wherein the matrix material comprises metal, plastic, ceramic or combinations including at least one of the foregoing.

Embodiment 8: A method for making a mesh to dispose in a component for wear resistance including growing a plurality of inserts and a web connecting the inserts to one another and maintaining geometry and spacing of the inserts.

Embodiment 9: The method as in any prior embodiment wherein the growing includes infiltrating a material into another material.

Embodiment 10: The method as in any prior embodiment wherein the material is tungsten carbide and wherein the another material is cobalt or nickel or combinations including at least one of the foregoing.

Embodiment 11: The method as in any prior embodiment wherein the growing includes depositing a first material for the plurality of inserts and a different material for the web.

Embodiment 12: A method for producing a component having wear resistance and ductility including growing a mesh including a plurality of inserts and a web connecting the inserts to one another and maintaining geometry and spacing of the inserts, and disposing a matrix material about the mesh such that surfaces destined for wear have exposed wear surfaces of the mesh.

Embodiment 13: The method as in any prior embodiment wherein the inserts comprise Tungsten Carbide (WC), Silicon Carbide (SiC), Nickel Boride (NiB), Zirconia and combinations including at least one of the foregoing.

Embodiment 14: The method as in any prior embodiment wherein the matrix material comprises metal, plastic, ceramic or combinations including at least one of the foregoing.

Embodiment 15: The method as in any prior embodiment wherein the growing comprises depositing a material for the plurality of inserts and a different material for the web.

The use of the terms "a" and "an" and "the" and similar referents in the context of describing the invention (especially in the context of the following claims) are to be construed to cover both the singular and the plural, unless otherwise indicated herein or clearly contradicted by context. Further, it should further be noted that the terms "first," "second," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity).

The teachings of the present disclosure may be used in a variety of well operations. These operations may involve using one or more treatment agents to treat a formation, the fluids resident in a formation, a wellbore, and/or equipment in the wellbore, such as production tubing. The treatment agents may be in the form of liquids, gases, solids, semi-solids, and mixtures thereof. Illustrative treatment agents include, but are not limited to, fracturing fluids, acids, steam, water, brine, anti-corrosion agents, cement, permeability modifiers, drilling muds, emulsifiers, demulsifiers, tracers, flow improvers etc. Illustrative well operations include, but are not limited to, hydraulic fracturing, stimulation, tracer injection, cleaning, acidizing, steam injection, water flooding, cementing, etc.

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited.

What is claimed is:

1. A wear resistant mesh for construction of a machine component comprising:
   a plurality of inserts, each insert having an insert wear surface; and
   a web connecting the inserts to one another and maintaining geometry and spacing of the inserts to position each insert wear surface at a machine component wear surface of the machine component of which the mesh will form a part, non initial wear surfaces of the machine component being devoid of inserts.

2. The mesh as claimed in claim 1 wherein the wear surfaces are end surfaces of the inserts.

3. The mesh as claimed in claim 1 wherein the web aligns with the insert wear surfaces.

4. The mesh as claimed in claim 1 wherein the inserts comprise Tungsten Carbide (WC), Silicon Carbide (SiC), Nickel Boride (NiB), Zirconia and combinations including at least one of the foregoing.

5. A machine component comprising:
   a mesh including a plurality of inserts and a web connecting the inserts to one another and maintaining geometry and spacing of the inserts; and
   a matrix material disposed about the mesh, the material exposing selected wear surfaces of the mesh at a machine component wear surface of the machine component, non initial wear surfaces of the machine component being devoid of inserts.

6. The machine component as claimed in claim 5 wherein the inserts comprise Tungsten Carbide (WC), Silicon Carbide (SiC), Nickel Boride (NiB), Zirconia and combinations including at least one of the foregoing.

7. The machine component as claimed in claim 5 wherein the matrix material comprises metal, plastic, ceramic or combinations including at least one of the foregoing.

8. A method for making a mesh to dispose in a machine component for wear resistance comprising:
   growing by an additive manufacture process, a plurality of inserts and a web connecting the inserts to one another and maintaining geometry of the inserts to mimic a geometry of an initial wear surface of a machine component and spacing of the inserts, each of the inserts having a wear surface disposed to reside at the initial machine component wear surface of the machine component of which the mesh will form a part, non initial wear surfaces of the machine component being devoid of inserts.

9. The method as claimed in claim 8 wherein the growing includes infiltrating a material into another material.

10. The method as claimed in claim 9 wherein the material is tungsten carbide and wherein the another material is cobalt or nickel or combinations including at least one of the foregoing.

11. The method as claimed in claim 8 wherein the growing includes depositing a first material for the plurality of inserts and a different material for the web.

12. A method for producing a machine component having wear resistance and ductility comprising:
   growing a mesh having a plurality of inserts and a web connecting the inserts to one another and maintaining geometry and spacing of the inserts in a shape of a machine component; and
   disposing a matrix material about the mesh such that each of the inserts are exposed at initial surfaces destined for wear on the machine component, non initial wear surfaces of the machine component being devoid of inserts.

13. The method as claimed in claim 12 wherein the inserts comprise Tungsten Carbide (WC), Silicon Carbide (SiC), Nickel Boride (NiB), Zirconia and combinations including at least one of the foregoing.

14. The method as claimed in claim 12 wherein the matrix material comprises metal, plastic, ceramic or combinations including at least one of the foregoing.

15. The method as claimed in claim 12 wherein the growing comprises depositing a material for the plurality of inserts and a different material for the web.

* * * * *